United States Patent Office 3,541,425
Patented Nov. 17, 1970

3,541,425
ACTIVE CURRENT CONTROLLING FILTER
Hans E. Weidmann, Glendale, Wis., assignor to Allen-Bradley Company, Milwaukee, Wis., a corporation of Wisconsin
Filed June 14, 1968, Ser. No. 737,241
Int. Cl. G05f 1/56
U.S. Cl. 323—22                                   6 Claims

ABSTRACT OF THE DISCLOSURE

An active type of filter for connection between a D.C. power supply and a load drawing a pulsating direct current, such filter functioning to block the pulsating current components at the load from flowing to the direct current power supply. The filter comprises an energy storage capacitor across the filter output which is connected to the direct current load, a current controlling valve in the form of a transistor connected between the filter input and the storage capacitor that monitors the current flow to the capacitor, and control elements associated with the monitoring transistor to provide a substantially constant flow of charging current to the capacitor even though the load is drawing a pulsating current from the capacitor. The control elements include a resistor joined across the base and collector elements of the transistor to establish a base current, a capacitor between the resistor and a common return joined with the storage capacitor that bypasses transient currents due to fluctuations in load current, and diodes in series with the resistor that provide a substantially constant voltage between the transistor base and collector. The circuit also includes additional elements operable during starting in which large transient load currents are delivered without injury to the monitoring transistor.

BACKGROUND OF THE INVENTION

The filter of the present invention is primarily intended for applications in which a load draws a pulsating direct current and it is desired to block the pulsations from flowing to the power supply operating the load and other equipment joined to the power supply. In most filter applications the power supply contains alternating voltage components that are to be attenuated, so as not to detrimentally influence load circuits, and a great variety of filters have been devised for this purpose. The present invention, however, has been conceived for insertion between a D.C. supply and a load drawing pulsating current that the D.C. supply cannot tolerate. For example, a load might comprise a D.C./A.C. inverter that drives a synchronous motor, such inverter drawing a direct current having periodic transients. The D.C. supply may be feeding equipment in addition to the inverter that would be impaired in its operation by such transients. Hence, the transients of the inverter load current must be prevented from flowing to the D.C. supply and other equipment. The present invention fulfills this need, and consequently is in that class of filters wherein a constant direct current is caused to flow through the filter in one direction while alternating current components are attenuated, or blocked in the opposite direction.

Passive types of filter networks may be designed and constructed to achieve the desired purpose of blocking feedback of transient components developed by a load. However, passive filter networks become unduly large in size when very low frequency components are to be blocked. Both weight and volume of such passive devices thus become limiting factors. Also, many types of apparatus draw substantial load currents, so that the filter must be able to handle substantial power, and again passive types of filter networks become large and bulky devices.

Another difficulty with the passive type of filter is that the attenuation may vary substantially with frequency. A still further disadvantage is that attenuation may be difficult to realize when used for a power supply having a very low impedance, such as frequently encountered with a D.C. power supply.

Active filters include elements that draw power in their operation, such as transistors and operational amplifiers, and thus derive their class name "active" from this fact that they incorporate some circuit elements that are themselves active in nature. Normally, active type filters are used for attenuating alternating components in the power supply, and some forms for blocking feedback of alternating components derived from a load have heretofore been developed. For example, copending application Ser. No. 564,212, filed July 11, 1966 and entitled "Active Low Pass Filter," now Pat. No. 3,414,824, dated Dec. 3, 1968, is of this type. In such a filter, however, amplifiers are included that change the transconductance in a shunt path in response to the sensing of alternating current components. Such filter gives excellent results over a wide range of frequencies, but not all applications require this wide frequency response of the circuit of such filter.

The present invention provides a filter for blocking the feedback of alternating current components generated by a load over a substantial frequency range, and achieves this result in a small, compact circuit.

SUMMARY OF THE INVENTION

The present invention is an active type filter and resides in a filter having an energy storage device at the output connections, a current controlling valve between the filter input and the output connections, and a control circuit that develops operating conditions for the current controlling valve in which load current passing through the valve remains substantially constant regardless of voltage fluctuation at the energy storage device.

The circuit of the invention may also include elements that govern operation during starting of the load upon closure of the circuit, so that instantaneous load currents may be handled without the transient conditions occurring upon starting being injurious to the elements of the filter.

The circuit of the invention may not only be embodied in a compact and lightweight construction, as hereinbefore noted, but may also have large current ratings so that substantial loads can be accommodated while maintaining adequate attenuation, or blocking of alternating components of load currents.

Other advantages of the invention are that it is effective over a substantial range of source and load impedances, that high attenuation of transients at the load is obtained, that only a small voltage drop occurs across the filter so substantially the entire supply voltage is made available to the load, that only a small power drain is required for operation, and no separate power supply is required for the operation of the filter. Thus, a very effective filter is obtained for the purpose of keeping a D.C. power supply free of transient currents that would otherwise arise from the characteristics of a load operated from the supply, such filter being of high efficiency and not requiring any separate power supply.

BRIEF DESCRIPTION OF THE DRAWING

In the drawing there is shown by way of illustration and not of limitation a specific, preferred embodiment of the invention. In the drawing.

DESCRIPTION OF PREFERRED EMBODIMENT

Figure 1:
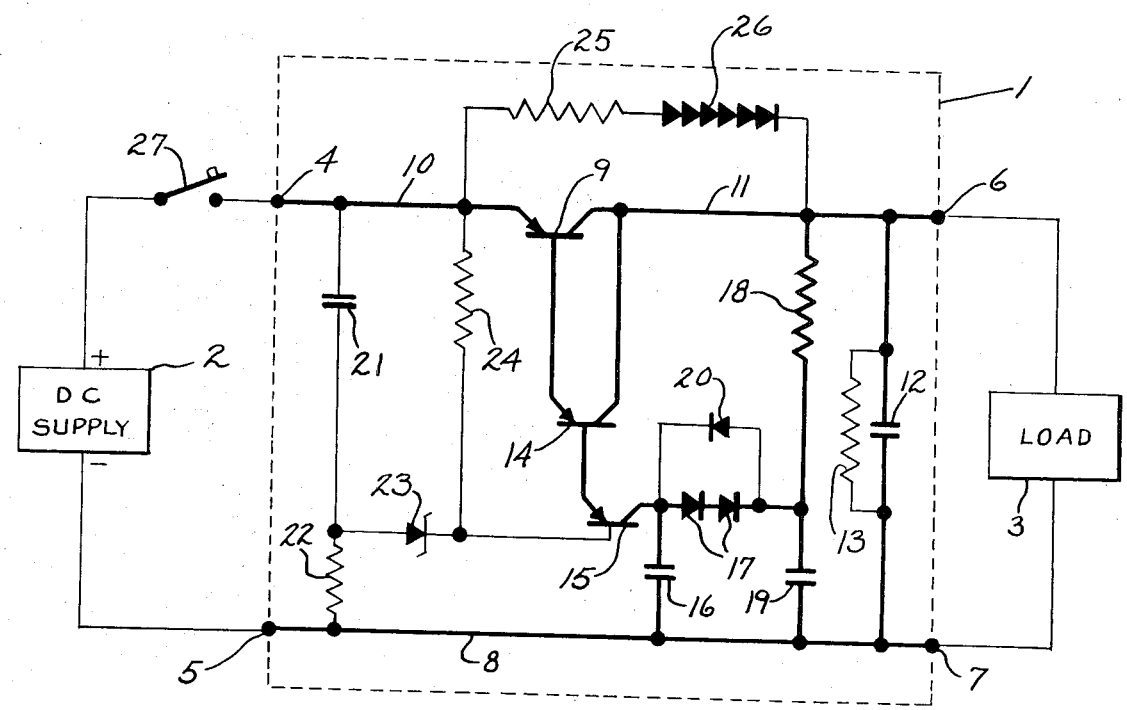
FIG. 1 is a circuit diagram of an active type filter embodying the invention.

Referring to FIG. 1, there is shown an active filter 1 designated by a dotted rectangle that encloses the circuit elements comprising the filter. Parts of the filter 1 which function during normal, steady state operation are shown in heavy lines, and parts which are concerned primarily during starting of a load are shown in light lines. The filter 1 is connected between a D.C. supply 2 and a load 3, and its function is to draw direct current from the supply 2 at substantially steady state values while attenuating or blocking alternating current components generated by the load 3 from appearing at the D.C. supply 2.

The filter 1 has a pair of input connections 4, 5 and a pair of output connections 6 and 7. A common return lead 8 extends between the connections 5 and 7. A monitoring transistor 9, that functions as a current controlling valve, is joined between the connections 4 and 6 by a pair of leads 10 and 11. The emitter of the transistor 9 is joined to the lead 10 and the collector is joined to the lead 11, so that direct current load currents passing through the filter 1 will flow from the input connection 4 to the transistor emitter and from the transistor collector toward the output connection 6. Return currents will, of course, flow through the lead 8 toward the D.C. supply 2. A capacitor 12 that functions to store energy for feeding the load 3 is joined across the output connections 6 and 7, and it is continuously charged during steady state operation by a charging current monitored by the transistor 9. A discharge resistor 13 is connected across the capacitor 12, to serve as a means for discharging the capacitor when the apparatus is turned off, and also as an element for stabilizing operation in the event there is no load 3 connected to the filter.

A second transistor 14 is connected with the transistor 9 in a so called Darlington configuration. The collectors of the two transistors 9, 14 are connected in common, and the base of the transistor 9, which is the control element of the transistor 9, is joined to the emitter of the transistor 14. These transistors present a high impedance to alternating current that may tend to flow from right to left in lead 11, but they present a low impedance to direct current flowing from left to right in leads 10 and 11. The transistor 14 is commonly termed a driver for the transistor 9, and the base of the transistor 14 is connected to a switching transistor 15.

The collector of the transistor 15 is joined through a capacitor 16 to the lead 8. The collector is also connected to a pair of diodes 17 that are in series with one another. The side of the diodes opposite that connected with the transistor 15 is joined through a control current resistor 18 to the lead 11, and also through a by-pass capacitor 19 to the lead 8. An additional diode 20 is shunted across the diodes 17 in a reverse direction.

A start up capacitor 21 and a start up resistor 22 are connected in series with one another between the leads 10 and 8, so that they may draw current from the input connections 4 and 5. A Zener diode 23 is connected to the common connection of the capacitor 21 and the resistor 22, and the opposite side of the Zener diode 23 is connected to the base of the switching transistor 15. A stabilizing resistor 24 is connected between the base of the switching transistor 15 and the lead 10.

To complete the circuit, a resistor 25 and a set of six diodes 26 all connected to one another in series are in parallel, or shunt relation to the emitter and collector elements of the transistor 9.

DESCRIPTION OF OPERATION

As noted hereinbefore, the principal parts of the circuit of the filter 1 that are operative during normal, steady state operation are shown in heavy lines, while other portions of the circuit constituting protective elements active primarily upon closeing of a control switch, such as a switch 27, and during starting starting of a load are shown in light lines. The description of operation will commence with a discussion of operation after the starting of a load, in which normal conditions exist.

The load 3 draws a direct current, but its requirements fluctuate with time, so that a direct current having rapid pulsations is drawn. The voltage across the energy storage capacitor 12 will have corresponding rapid pulsations due to the alternating current components. Such pulsations would cause fluctuations of the D.C. power supply voltage because of the finite impedance of the supply, if alternating current components were not filtered by the apparatus of the invention. A typical load 3 that produces such rapid pulsations that must be filtered is an inverter that supplies a synchronous motor driving a pump. The inverter power requirement drops periodically during thyristor commutation, and one typical inverter has fluctuations producing alternating current components at about 1,000 herz and harmonics thereof. It is necessary to filter these components from the D.C. supply.

To establish a base current for the transistor 9 the control current resistor 18 is provided, and the base current path conducts a control current from the lead 10, through the transistor 9 and out the base, then through transistor 14 to transistor 15 and hence to the diodes 17 and the resistor 18 to the lead 11, and then through the load 3, or capacitor 12 when undergoing charging, to the return lead 8.

Figure 2:
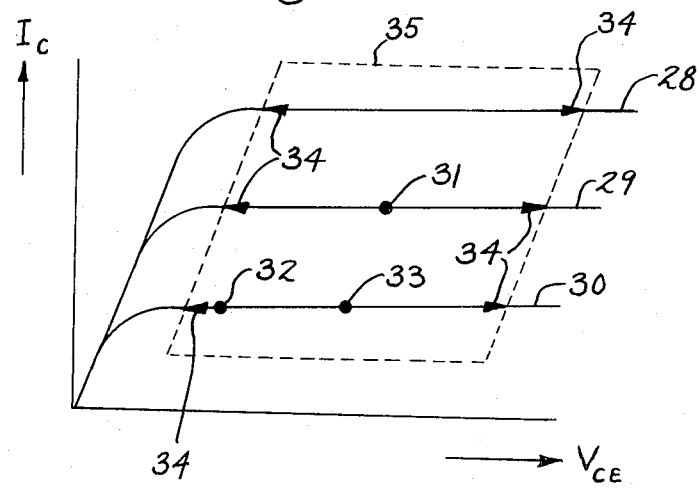
FIG. 2 is a graph depicting operating characteristics of the filter of FIG. 1.

The effect of establishing a base current for the monitoring transistor 9 is illustrated in the graph of FIG. 2. The voltage across the collector and emitter is represented by the abscissa, and the collector current flowing through the lead 11 to the capacitor 12 is represented by the ordinate. The family of curves 28, 29 and 30 represent transistor operating curves for different values of base current. For example, curve 28 is for a high value of base current, curve 29 is for a moderate value of base current and curve 30 is for a low value of base current. It is seen that by holding the base current at some constant value the collector current will be substantially constant over a range of collector-emitter voltage. Establishment of a base current also has an effect upon establishing the transistor collector-emitter voltage, and for purposes of illustration the point 31 may be that deemed as the selected operating point of the transistor 9. This point 31 is established primarily by the voltage drop across the diodes 17.

In operation, the rapidly pulsating characteristic of the load current drawn by the load 3 will cause a variation in the voltage across the capacitor 12, with the result that pulsating current components are introduced in the control current resistor 18. This would cause a pulsation in the transistor base current and the transistor would deviate from the curve 29 in FIG. 2. The by-pass capacitor 19 is introduced in the circuit to shunt such pulsating components from the transistors directly to the return lead 8. The capacitor 16 functions as an addional by-pass for supplementing the filtering of the capacitor 19. Hence, the base current for the transistor 9 may be kept substantially constant, to retain the operation of the transistor on the curve 29.

Now, when the load current of the load 3 pulsates rapidly the voltage across the capacitor 12, as stated above, also fluctuates. This voltage pulsation correspondingly raises and lowers the collector-emitter voltage. However, the graph of FIG. 2 indicates that as these swings in voltage occur transistor 9 will operate along the horizontal portion of the curve 29, deviating to either the left or right of the point 31. Throughout such swings in voltage the transistor consequently continues to deliver a nearly constant collector current for charging the energy storage capacitor 12. Hence, the D.C. supply 2 is called upon to deliver a substantially constant output current to the apparatus, even though the load 3 draws a pulsating current having rapid fluctuations.

The current consumed by the load 3 may also vary relatively slowly from one value level to another. For example, if a motor is being driven which is rated to normally draw 20 amperes has its load reduced, then motor current may decrease to a value such as 10 amperes. This lower current will also have superimposed rapidly pulsating fluctuations as did a 20 ampere load. The decrease in the basic load current value, of 20 amperes to 10 amperes has the effect of lowering the control current in the resistor 18. Operation of the transistor 9 will then drop from the curve 29 to a curve such as 30. Since collector-emitter voltage is almost the same value as base-collector voltage, and base current has decreased, then the point of operation on the curve 30 may shift considerably to the left, such as to a point 32. If the transistor 9 were to operate at the point 32 it could not accommodate for the rapid voltage swings, or fluctuations at its collector to the left of the point 32 and maintain constant collector current.

To overcome the foregoing difficulty, the diodes 17 are introduced into the circuit. These diodes may be deemed as in the base circuit of the transistor 9, similarly as the resistor 18 and capacitors 16 and 19. They provide a substantially constant voltage drop in the base circuit, regardless of the load current of the load 3. The resulting effect is to maintain the base-collector voltage at a nearly constant value, which in turn maintains the collector-emitter voltage of the transistor 9 at nearly the same value. As a result, if load current decreases, such as to drop operation of the transistor 9 to the curve 30 in FIG. 2, the point of operation will be maintained sufficiently out to the right on the curve 30 to a point, such as point 33 at which rapid fluctuations or pulsations in load current can be accommodated, whether they swing to the left or the right of the point 33. Typical rapid swings, or pulsations of voltage due to alternating current components of the load current of the load 3 are represented by the arrowheads 34 in FIG. 2, and the operating range of the transistor 9 may thus be maintained within an area such as that illustrated by the dotted parallelogram 35.

The operation at start up of the load 3, that occurs when the switch 27 is initially closed, will now be described. Transient surges during start up may be injurious to the transistor 9, and consequently the transistor is removed from the active circuit until the capacitor 12 has been substantially charged. To retain the transistor 9 out of the active circuit during start up, the switching transistor 15 is provided. This transistor 15 functions as an open switch in the base current circuit of the transistor 9 when the switch 27 is first closed. This keeps the transistors 9 and 14 cut-off during initial start up of the circuit.

When the switch 27 is closed, the capacitor 21 will draw a charging current through resistor 22, and this places an increasing voltage across the Zener diode 23. When the voltage across the Zener doode 23 reaches some predetermined level it will conduct, and when it conducts current will then flow through both the resistor 24 and the base of the transistor 15. This will gradually turn on the transistor 15, and hence the operation of this transistor is time delayed by the charging current of the capacitor 21 and the breakdown voltage of the Zener diode 23.

Prior to the switching on of the transistor 15, a charging current is delivered to the energy storage capacitor 12 and the load 3 through the resistor 25 and cascaded diodes 26 shunted across the emitter and collector of the transistor 9. The voltage across the storage capacitor 12 will build up to nearly the D.C. supply voltage, less the voltage drop across the resistor 25 and cascaded diodes 26, and large inrushes will largely subside before the transistor 15 becomes operative. Also, during the initial start up period the diode 20 provides a path for charging the capacitor 16, so that both capacitors 16 and 19 are properly charged at the time the switching transistor 15 is turned on.

When the switching transistor 15 is turned on it will slowly develop a current. The circuit for its base extends from the lead 10 through the bases of the transistors 9 and 14, then through the transistor 15 itself, and then through the Zener diode 23 and resistor 22. Hence, as the transistor 15 turns on the transistor 9 in turn gradually develops a base current. The load current assumed by the transistor 9 similarly develops, so that it is not subjected to injurious inrush currents. The voltage across the transistor 9 when it is conducting load current will be quite small, substantially less than the total voltage required to maintain the cascaded diodes 26 in a conducting state, and hence as the transistor 9 assumes load current the diodes 26 will cease to conduct and the shunt path about the transistor 9 is effectively removed from the active circuit. During normal, steady state operation the switching transistor 15 will continue to draw a base current, hence the Zener diode 23 and resistor 22 remain as a part of the active circuit, even though they were not drawn in heavy lines in FIG. 1.

The invention in its preferred form thus provides an energy storage element for supplying pulsating direct current to a load, but which is charged by a steady direct current. The pulsations from the load are blocked from the power supply by a monitoring current controlling valve, that may be in the form of a transistor, which presents a high impedance to alternating current in one direction and the low impedance to direct current in the other direction. To maintain the current through the current controlling valve at a nearly constant level a by-pass capacitor is provided that shunts alternating current components from the control element of the current valve.

The by-pass capacitor 19 of the embodiment of FIG. 1 is in series with the control resistor 18, and the time constant of the circuit of these elements is such that if rapid fluctuations occur in the load the base current through the resistor will remain sufficiently constant, so that the current controlling valve 9 will operate on one characteristic curve. However, if there is a slow variation in load current to another level, then the time constant is such that the D.C. level of the current in the resistor will follow the variation and the base current will change accordingly so that the valve 9 will operate on a different characteristic curve.

For starting, the current controlling valve is kept out of the active circuit by a time delay obtained through a switching device in the circuit of the control element of the current controlling valve. This switching device is in the form of a transistor 15 in the embodiment of FIG. 1. The time delay is sufficient to protect the current controlling valve 9 from excessive power, current and voltage, and a typical delay before full current is assumed may be as long as five seconds.

I claim:
1. In an active type filter the combination comprising:
input connections for atetachment to a direct current power supply;
output connections for attachment to a direct current load that draws a load current of fluctuating character;
a current controlling valve having a pair of load current conducting elements connected between an input connection and an output connection, such valve having a control element and also a characteristic curve with a substantially constant output current through said load current conducting elements for a given control element current when the voltage drop between said pair of conducting elements is maintained within an operating range;
a control current circuit comprising a resistor joined with said control element to establish a control current;
a by-pass capacitor connected to shunt alternative current components in said control current circuit around said control element; and
a voltage regulating diode in circuit with said control element and said resistor that governs the voltage value applied to said control element to maintain the voltage drop between said pair of conducting elements within said operating region.

2. An active type filter as in claim 1 having:
a high resistance by-pass circuit across said current controlling valve that includes an unidirectional current conducting element having a threshold conduction at a voltage greater than the voltage across said current controlling valve when such current controlling valve is conducting;
a switching element in the circuit of the control element of said current controlling valve;
a charging capacitor across the input connections; and
a delayed conducting device that first conducts upon a substantial voltage being applied thereto which is joined with said charging capacitor and said switching valve to actuate the switching valve upon reaching a preselected charge of said charging capacitor.

3. In an active type filter the combination comprising:
input connections for attachement to a direct current power supply;
output connections for attachment to a direct current load that draws a fluctuating current;
energy storage means across the output connections;
a solid state current controlling valve connected between an input connection and an output connection;
a second solid state valve in driving relations to the first;
a control current circuit joined with said solid state valves to establish a control current therefore;
a by-pass capacitor in said control current cricuit connected to filter out alternating current components of said control current; and
a voltage regulating diode in said control current circuit governing a voltage applied to said solid state valves to maintain a sufficient range of operation for the current controlling valve over a substantially flat characteristic curve.

4. In an active type filter the combination comprising:
input connections for attachment to a power supply;
output connections for attachment to a load;
a transistor valve having the collector-emitter circuit joined between an input connetcion and an output conection, such transistor also having a base element;
a control resistor between said base element and an output connection;
a by-pass capacitor between said control resistor and a second output connection; and
a diode connected with the control resistor and said base element.

5. In an active type filter the combination comprising:
input connections for attachment to a power supply;
output connections for attachment to a load having a load current of fluctuating character;
an energy storage device at the output connection;
a current controlling valve having a pair of load current conducting elements joined between an input connection and an output connection, such valve having a control element;
a control current circuit connected to one of said load current conducting elements to generate a control current;
a direct current by-pass means connected across said pair of load current conducting elements of said current controlling valve to conduct current when the voltage drop between said pair of load current conducting elements exceeds a preselected amount;
a switching valve connecting said control current circuit with said control element of said current controlling valve; and
a time delay circuit for said switching valve that delays switching valve operation until after initial energization of the filter.

6. In an active type filter the combination comprising:
input terminals for attachment to a power supply;
output terminals for attachment to a load;
a transistor having its emitter connected to a first input terminal and collector connected to a first output terminal;
a line connected between a second input terminal and a second output terminal;
a control current circuit connected between the collector and base of said transistor to supply base current to operate said transistor and having a diode connected to conduct at least a portion of said base current; and
a by-pass capacitor connected between said control current circuit and said line.

References Cited
UNITED STATES PATENTS

| | | |
|---|---|---|
| 2,801,346 | 7/1957 | Rongen et al. |
| 2,888,633 | 5/1959 | Carter _____ 323—9 |
| 2,967,991 | 1/1961 | Deuitch. |
| 3,109,980 | 11/1963 | Wiley. |
| 3,151,289 | 9/1964 | Harpley. |
| 3,204,175 | 8/1965 | Kuriger. |
| 3,251,951 | 5/1966 | Meewezen. |
| 3,418,561 | 12/1968 | Feldman _____ 330—80 X |

J D MILLER, Primary Examiner

G. GOLDBERG, Assistant Examiner

U.S. Cl. X.R.

321—10; 323—39; 333—80